Sept. 18, 1923.

E. HOPKINS 1,468,300

COOKING AND HEATING STOVE

Original Filed Nov. 28, 1919    2 Sheets-Sheet 1

INVENTOR
Evan Hopkins
BY
ATTORNEY

Sept. 18, 1923.
E. HOPKINS
COOKING AND HEATING STOVE
Original Filed Nov. 28, 1919  2 Sheets-Sheet 2
1,468,300
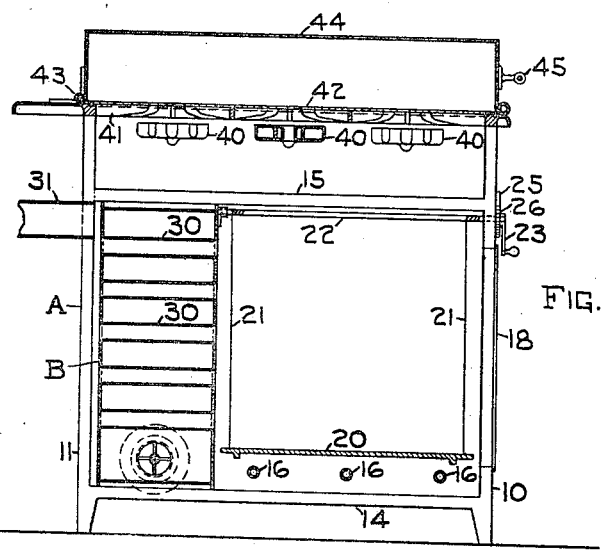
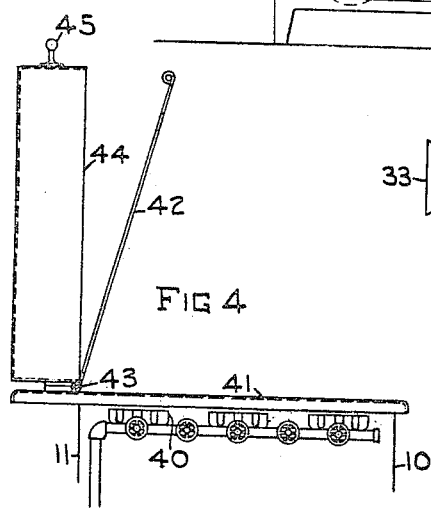
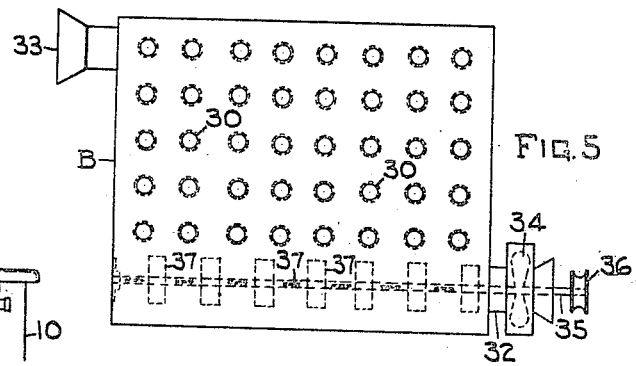
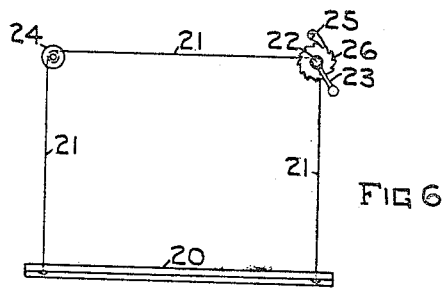
INVENTOR
Evan Hopkins
BY Bradbury & Caswell
ATTORNEY Patented Sept. 18, 1923.

1,468,300

UNITED STATES PATENT OFFICE.

EVAN HOPKINS, OF ST. PAUL, MINNESOTA.

COOKING AND HEATING STOVE.

Application filed November 28, 1919, Serial No. 341,204. Renewed February 19, 1923.

*To all whom it may concern:*

Be it known that I, EVAN HOPKINS, a citizen of the United States, residing at St. Paul, in the county of Ramsey and State of Minnesota, have invented a new and useful Improvement in Cooking and Heating Stoves, of which the following is a specification.

An object of this invention is to provide a stove which is adapted for cooking or for heating the rooms of dwellings or other structures, by the use of gas or other fuel. A further object is to provide means for accomplishing the results above stated in an efficient and effective manner and wherein the air to be heated does not come into direct contact with the flame of the burner but is heated directly and forced positively through the stove and into the structure to be heated. A further object is to combine with a stove of the character stated means for supporting food to be cooked which can be adjusted in the oven and regulated in position as regards the burner without having to open the oven doors, and without the operator having to touch the food or containers holding the food. A still further object is to combine with a stove of the character stated a heating pan and a closure over the pan above the burner or burners, said pan and closure being independently movable from a position directly over the burner or burners when it is desired not to use the same. Other objects and advantages will be apparent from the following description and to these ends my invention comprises the features of construction and combination of parts hereinafter set forth.

Figure 1:
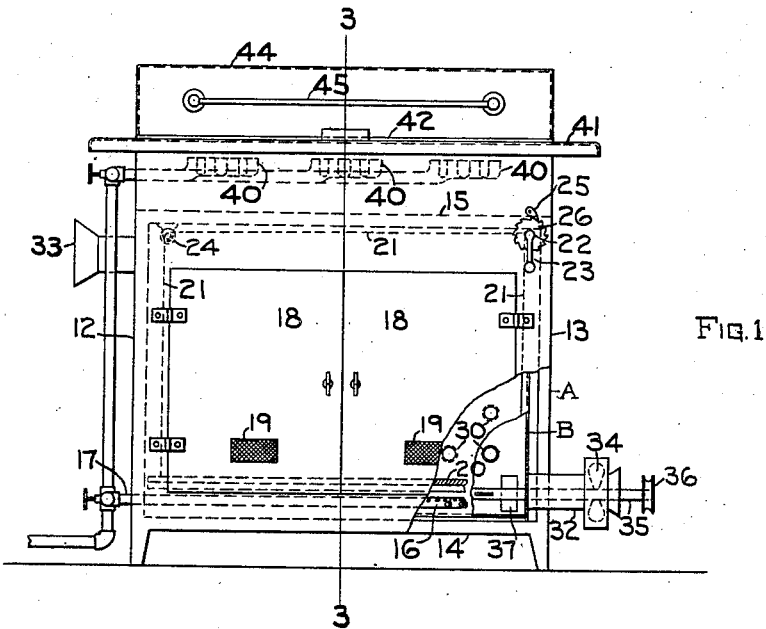
Figure 2:
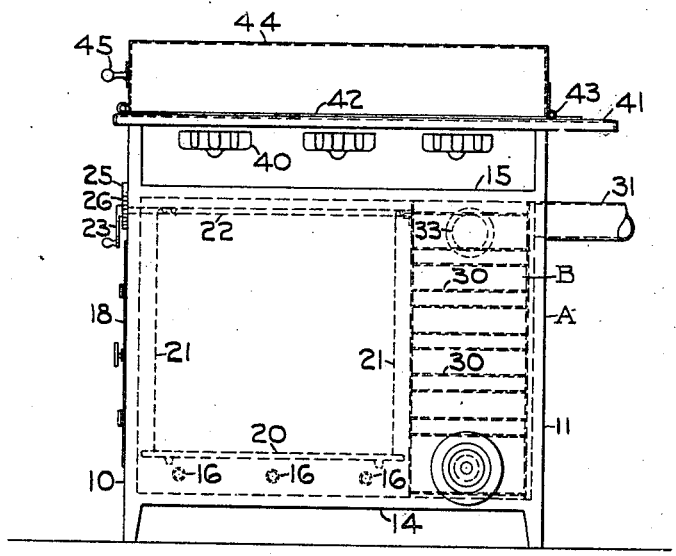

In the accompanying drawings forming part of this specification, Fig. 1 is a front elevation of my invention part of the structure being broken away for the purpose of more clearly showing parts of its interior; Fig. 2 is an end elevation of the structure illustrated in Fig. 1; Fig. 3 is a section taken on the line 3—3 of Fig. 1; Fig. 4 is an end elevation of a portion of the structure illustrated in Fig. 1 and showing the supplemental top in elevated position; Fig. 5 is a side elevation of the air heater removed from the stove and Fig. 6 is a diagram of the adjustable shelf in the oven and its operating apparatus for adjusting it in elevation.

In the drawings A indicates the frame of the stove which is constructed with the usual front and back walls 10 and 11, end walls 12 and 13, floor 14 and top wall 15, said walls forming an oven in which the gas burner 16 is situated near the floor and supplied with gas by the valved control pipe 17. The front wall of the structure is provided with the usual oven doors 18 through which air is admitted into the oven for supplying oxygen to the burner by the grated openings 19.

Situated in the oven above the burner is a supporting tray 20 for food to be cooked in the oven, said tray being adjustable in elevation by the supporting flexible hangers 21, the lower ends of which are attached to the tray and the upper ends secured to a winch shaft 22 which is journaled across the structure and provided on its forwardly extending end with a handle 23 by which it can be turned to wind or unwind the flexible supports and raise or lower the shelf in the oven. Part of the flexible hangers 21 pass over sheaves 24 so as to cause the shelf to be raised and lowered evenly by all of the hangers. The winding shaft 22 is provided with a pawl and ratchet wheel 25 and 26 by which the shaft is prevented from revolving when desired, thus supporting the shelf at adjusted elevation. By this construction the food or containers holding food placed on the shelf in the oven can be graduated in height over the burner without opening the oven doors, the operator having only to turn the handle 23 and adjust the pawl 25 to accomplish this result. The food can consequently be cooked to better advantage in the oven and the operation of the stove is simplified.

When desired the stove can be used for warming a room or a number of rooms. To accomplish this result an air heater in the form of a heating chamber B is placed in the back of the oven and distanced shortly away from the back wall 11. This heating chamber is provided with a plurality of heating tubes 30 extending backwardly across the heating chamber and permitting heated air and gases from in the oven to circulate from the burner 16 backwardly across the heating chamber and to the outer atmosphere through the vent duct 31, which is connected with the upper back portion of the oven. Fresh air to be heated is admitted into the heating chamber by the air ingress duct 32 near its lower portion and the heated air from the heating chamber passes outwardly through the hot air supply duct 33 connected with the upper portion of the heating chamber. This hot air supply duct may be continued to any point or points desired for heating a room or a number of rooms by the stove. To force the supply of air to be heated into the heating chamber a fan 34 mounted upon a shaft 35 and driven by the pulley 36 or any other suitable driving means is positioned near the outer end of the supply duct 32. The shaft 35 may also be provided with a number of air agitators 37 in the heating chamber for increasing the circulation of air in the heating chamber and beating it against the walls and other heating surfaces, thus causing the air in the heating chamber to become heated more effectively. The heating chamber thus provided produces a simple, effective and economical heating device for warming rooms by the same gas stove which is adapted for cooking purposes.

The top of the stove is provided with the usual gas burner 40 and grate top 41. This top has combined with it a supplemental top which is composed of a heating pan 42 of thin solid metal upon which bread can be toasted or other food fried or cooked. In lower position this pan rests flat upon the top of the stove over the burners. The pan is secured to the top by the hinge 43 which is positioned so that the pan can be swung up and to one side from over the burners leaving the burners free to be used in the ordinary manner. The supplemental top is also constructed with a warming chamber formed by the dome 44 having a handle 45 on one end and being secured to the top by the same hinge 43 which attaches the pan. In lowered position the dome closes over the pan and can be used to maintain even heat over the pan and around any containers or food placed on the pan. When desired the dome can be swung up as illustrated in Fig. 4 to one side, away from over the burners and out of the way so that the burners can be used in the ordinary manner. When the dome is in raised position the pan can be swung up against the dome and supported by the latter from lowering unintentionally. The entire structure provides a number of features of improvement which when combined or used separately produces a stove which can most effectively be employed for cooking or heating rooms by the use of gas as a heating medium.

In accordance with the patent statutes I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent, is:—

1. A stove having an oven, a gas burner in said oven, a tray supported at any selected elevation in the oven, above said burner, an air heating chamber constructed as a separate unit and placed in the back of the oven in position for its walls to be heated by the burner, said heating chamber having an air ingress duct passing through the wall of the oven from the outside of the stove and an oven egress duct passing through the wall of the oven for conducting heating air away from the heating chamber and stove for heating purposes and said stove having a door near the front portion of the oven and air ingress and egress openings in its walls for circulating air over the burner, through the oven and in contact with the walls of the air heating chamber.

2. A stove having an oven and a grate over the oven, a gas burner below the grate for heating articles placed thereon, a thin plate extending over the top area of the oven and hinged thereto and adapted in lowered position to rest on the grate and in raised position to be moved away from over the burner, and a large dome hingedly supported over the plate and adapted in lowered position to form substantially an air tight inclosure over the plate and in raised position to move away from over the burner.

In testimony whereof, I have signed my name to this specification.

EVAN HOPKINS.